No. 851,665. PATENTED APR. 30, 1907.
R. P. JACKSON.
VOLTAGE ADJUSTMENT MEANS.
APPLICATION FILED JULY 9, 1906.
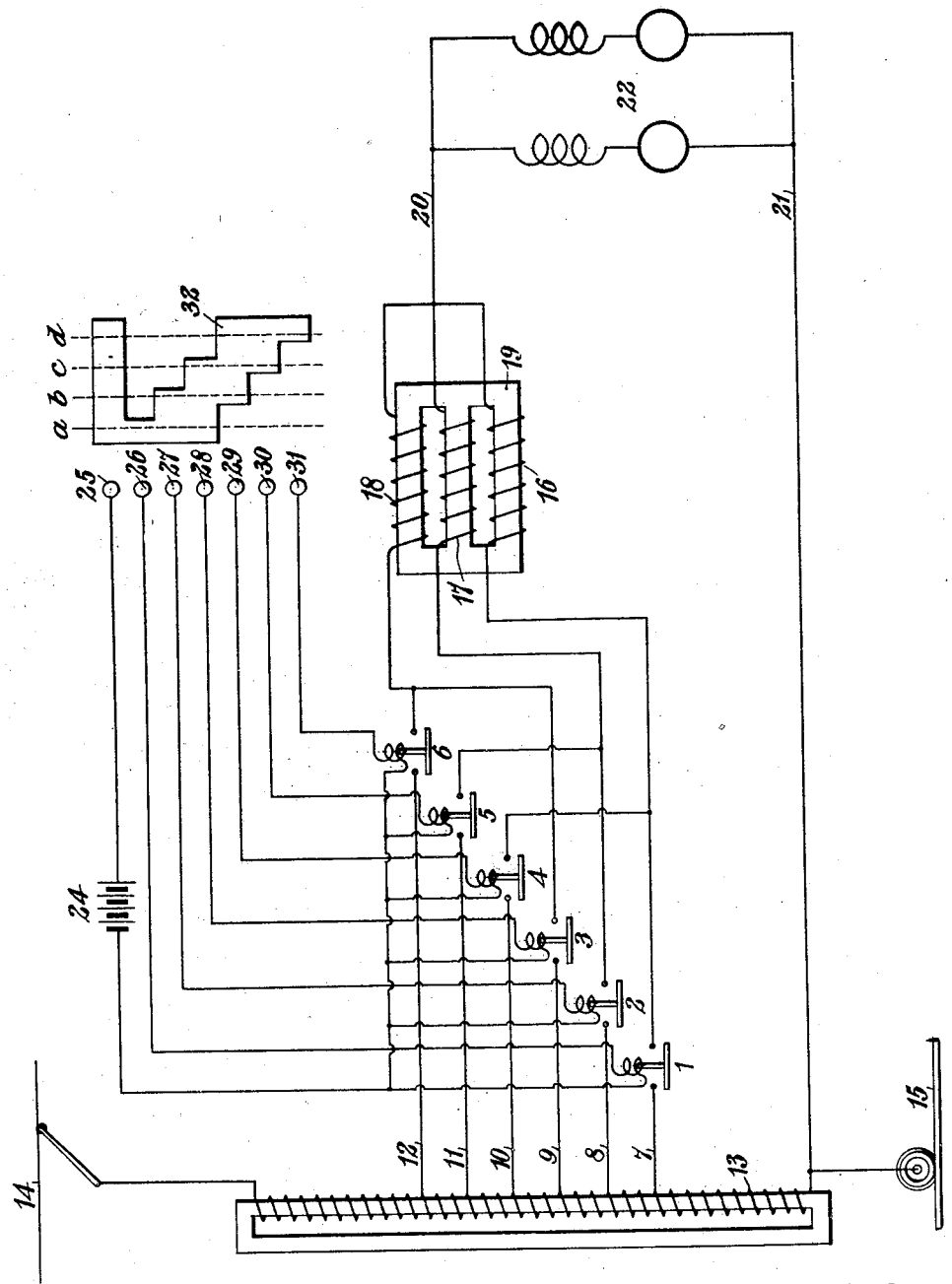
WITNESSES:
C. L. Belcher
Otto S. Schairer
INVENTOR
Ray P. Jackson
BY
Wesley G. Carr
ATTORNEY

UNITED STATES PATENT OFFICE.

RAY P. JACKSON, OF WILKINSBURG, PENNSYLVANIA, ASSIGNOR TO WESTINGHOUSE ELECTRIC & MANUFACTURING COMPANY, A CORPORATION OF PENNSYLVANIA.

VOLTAGE-ADJUSTMENT MEANS.

No. 851,665.  Specification of Letters Patent.  Patented April 30, 1907.

Application filed July 9, 1906. Serial No. 325,345.

*To all whom it may concern:*

Be it known that I, RAY P. JACKSON, a citizen of the United States, and a resident of Wilkinsburg, in the county of Allegheny and State of Pennsylvania, have invented a new and useful Improvement in Voltage-Adjustment Means, of which the following is a specification.

My invention relates to voltage regulators, and particularly to regulators that are adapted to vary the active lengths of transformer windings.

The object of my invention is to provide a simple and effective regulator of the character indicated whereby the voltage of a circuit that is traversed by large amounts of current may be varied without injury to the circuit making and breaking devices.

The single figure of the accompanying drawing is a diagrammatic view of a system of distribution that embodies my invention.

Corresponding terminals of a plurality of switches 1, 2, 3, 4, 5, and 6 at one side, are connected by means of spaced leads 7, 8, 9, 10, 11, and 12 to a transformer winding 13, that may be supplied with energy from any suitable source, such as a trolley conductor 14 and a track rail 15. The remaining terminals of switches 1 and 4 are connected to one terminal of an inductive winding 16, the remaining terminals of switches 2 and 5 are connected to one terminal of an inductive winding 17 and the remaining terminals of switches 3 and 6 are connected to one terminal of a third inductive winding 18, a common magnetizable core 19 being provided for the inductive windings. The remaining terminals of the inductive windings 16, 17, and 18 are connected together and to a distributing circuit conductor 20 between which and another conductor 21, motors 22 or other suitable translating devices may be connected. The switches 1 to 6 are severally provided with operating or controlling magnet windings 23, one terminal of each of which is connected to one terminal of a battery 24, the other terminal of the battery being connected to a stationary contact finger 25 of a master controller C. The master controller comprises further, a plurality of stationary contact fingers 26, 27, 28, 29, 30, and 31 that are connected, respectively, to the remaining terminals of the magnet windings for the switches 1 to 6, and a movable conducting segment 32 that is adapted to engage the stationary contact fingers in positions represented by broken lines *a*, *b*, *c*, and *d*. The reference characters that are placed opposite the position indicating lines *a*, *b*, *c*, and *d* designate the switches that are closed when the conducting segment of the master switch occupies these positions.

It will be readily understood from the foregoing description that when the conducting segment 32 of the master switch occupies the position *a*, switches 1, 2, and 3 will be closed and the inductive windings 16, 17, and 18 will be connected in parallel between the distributing circuit conductor 20 and the points in the transformer winding 7 to which the leads 7, 8, and 9 are connected. The voltage applied to the distributing circuit 20-21 will be then approximately equal to the difference of the potential existing between the transformer lead 8 and the track rail 15. Upon movement of the master switch to the position *b*, switch 1 opens and switch 4 closes, the inductive winding 16 being thereby disconnected from the transformer lead 7 and connected to the lead 10. After the switch 1 opens and upon closure of the switch 4, the voltage applied to the distributing circuit will be approximately equal to that existing in the transformer at a point midway between the leads 8 and 9, and after the switch 4 closes, the voltage applied to the distributing circuit will be approximately equal to the difference of potential existing between the transformer lead 9 and the track rail 15. The operation of the regulator will continue substantially as set forth, the terminals of the inductive windings being disconnected, one at a time, from the corresponding transformer leads and reconnected to others. Since the distributing circuit remains connected to the transformer under all conditions of operation, and since the total amounts of current traversing the circuits of the inductive windings when they are interrupted are only approximately one-third of the amount that is supplied to the distributing circuit, the amount of arcing at the switches will be insufficient to cause serious injury thereto.

Other numbers of inductive windings may be employed and they may be placed upon magnetizable cores in any suitable manner other than that shown, and, if desired, the circuits may be controlled by other suitable means, such, for instance, as the well known drum or other type of switch or controller. The arrangements of the circuits and the natures of the devices may be further varied within considerable limits without materially altering the mode of operation or departing from the spirit of the invention.

I claim as my invention:

1. The combination with a series of conductors supplied with progressively differing voltages, of a plurality of inductive windings, one terminal of each of which is connected to a distributing circuit, and means for connecting the remaining terminals respectively to the said supply conductors.

2. The combination with a series of conductors supplied with progressively differing voltages, of a plurality of inductive windings having a common magnetizable core, one terminal of each of which is connected to a distributing circuit, and means for connecting the remaining terminals respectively to the said supply conductors.

3. The combination with a series of conductors supplied with progressively differing voltages, of a plurality of inductive windings having a common magnetizable core, one terminal of each of which is connected to a distributing circuit, means for connecting the remaining terminals respectively to said supply conductors, and means for disconnecting the same, one at a time, from the corresponding supply conductors and reconnecting them to others.

4. The combination with a series of conductors supplied with progressively differing voltages, of a plurality of inductive windings, one terminal of each of which is connected to a distributing circuit, means for connecting the remaining terminals respectively to said supply conductors, and means for disconnecting the same, one at a time, from the corresponding supply conductors re-connecting them to others.

In testimony whereof, I have hereunto subscribed my name this 30th day of June, 1906.

RAY P. JACKSON.

Witnesses:
OTTO S. SCHAIRER,
BIRNEY HINES.